Patented May 9, 1939

2,157,667

UNITED STATES PATENT OFFICE 2,157,667

DYESTUFF AND METHOD OF MAKING THE SAME

Paul W. Jewel and John R. Pratt, Los Angeles, Calif., assignors to Max Factor & Co., Los Angeles, Calif., a corporation of Delaware No Drawing. Application June 15, 1938, Serial No. 213,823

11 Claims. (Cl. 260—335)

This invention relates to a new and novel series of dye compounds and methods of preparing the same and is particularly directed to dye compounds of the hydroxy phthalein type in which two of the benzene rings are connected by an oxygen bridge, each of said benzene rings containing a carboxyl group. These dyes may also be identified as dihydroxy, dicarboxy fluoran dyes.

The dye compounds of the present invention are characterized by their stability, high tinctorial power, high solubility in fixed oils and particularly in solvents containing a hydroxyl group, and the ability to be used wherever an indelible dye stuff or stain is desired. Moreover, the dye compounds of this invention are particularly well adapted for use in cosmetics such as, for example, rouge and lipsticks, because of the indelible character of the compound, lack of any toxic or allergic properties and the desirable red coloration of certain of the dye compounds embraced within the scope of this invention. Although the dye compounds of the invention may be employed for various and sundry purposes and uses, particular reference will be made to the characteristics of the dye compounds which render them eminently suited for use in cosmetics.

Heretofore, indelible dye stuffs of the fluorescein type have been employed but such dye stuffs, as for example eosin, produce a bluish tint or tone and this is not satisfactory. In order to minimize the blue tone and emphasize the red, it has been found necessary to add large quantities of dibrom-fluorescein. Continued application of these dyes to the skin may produce toxic effects which are difficultly corrected or minimized. The toxic character of some of such dyes may be evidenced by the development of dry, chapped lips and further continued use may produce pronounced physiological changes, such as swelling, itching, burning, etc.

It has been discovered that by coupling or reacting phthalic anhydride or halogen derivative thereof with resorcylic acid and then halogenating the resulting compound, a substantially non-toxic, indelible dye stuff may be prepared, the resulting halogenated compound having numerous highly desirable characteristics such as, for example, extremely high tinctorial power, ready solubility in most oils and highly desirable shadings ranging from an orange to a bluish red, depending upon the particular halogen employed and the degree of halogenation. Brilliant scarlets, carmine and orange red shades can be produced. The desirable characteristics of the resulting compound are apparently due to the presence of three benzene rings, two of said rings being connected by an oxygen bridge, each of these rings carrying a carboxyl group, the carboxyl groups being usually in the fourth position relative to the oxygen bridge.

It is an object of this invention, therefore, to disclose a method of preparing a new series of dye compounds from resorcylic acid and phthalic anhydride.

Another object is to disclose and provide ingredients, conditions and methods of producing dye compounds of the hydroxy phthalein type, such dye stuffs being characterized by the presence of two carboxyl groups.

An object of the invention is to disclose and provide indelible, substantially non-toxic dye stuffs comprising a dihydroxy, dicarboxy fluorans, these dye stuffs generally containing symmetrically placed hydroxy and carboxy radicals on the benzene rings that are linked through an oxygen bridge.

Another object is to provide substantially non-toxic, non-allergic dye compounds of high tinctorial power, such dye compounds containing three benzene rings, two of which are a part of a pyrone ring, two of said benzene rings carrying a carboxyl group.

A still further object of the invention is to provide a new series of dye compounds characterized by brilliance of orange and red colors, indelible character and non-toxic properties.

These and other objects, uses, advantages and adaptations of the invention will become apparent to those skilled in the art from the following detailed examples and description.

Generally stated, the process comprises reacting phthalic anhydride with resorcylic acid under conditions conducive to the elimination of moisture and in the substantial absence of alkalies. The resulting compound is then halogenated and the resulting halogenated dye compound is the basic product of this invention. This halogenated compound may be used in the manufacture of esters, ethers and salts.

During the original reaction between phthalic anhydride and resorcylic acid the two ingredients may be mixed in substantially molecular proportions (this meaning one molecular equivalent of phthalic anhydride and two molecular equivalents of resorcylic acid) and then heated slowly and for a relatively protracted period of time in order to reduce the mixture to a homogeneous mass. The reaction is preferably carried out under conditions conducive to the elimination of water and for this purpose dehydrating agents, such as anhydrous zinc chloride, sulfuric acid, calcium chloride, or other dehydrating agent may be added to the mixture. By conducting the reaction at subatmospheric pressures, the elimination of moisture is facilitated. Alkalies should be virtually absent from the reaction kettle. The progress of the reaction is subject to the law of mass action and although reference is made to the use of molecular proportions of phthalic anhydride and resorcylic acid, it will be obvious that these proportions may be varied with known result. The use of halogenated phthalic anhydride is recommended whenever a non-toxic product is desired.

After the completion of the reaction, the resulting compound is preferably cooled or if desired, rapidly chilled. It will be found that a relatively hard, brittle mass is formed; this mass can then be reduced to a state of fine division and washed with a solvent for the unreacted ingredients. Water washing is satisfactory. In order to facilitate removal of the mass from the reaction kettle, it may be first dissolved in an alcohol or alkali solution and then separated from such solution by evaporation and water washing or by any other suitable means.

The compound so obtained is then halogenated in any suitable manner. It has been found desirable to employ a solvent as a vehicle for the compound during halogenation. The vehicle may be any one of a large number of substances in which the compound may be dissolved or uniformly dispersed and in which the halogen being used is soluble or miscible but with which such halogen does not react to any appreciable extent. Acetic acid, ethyl alcohol, isopropyl alcohol, butyl alcohol, glycol derivatives, etc., may be employed as vehicles during this final halogenation.

The resulting halogenated compound is the free dye stuff of this invention and may be repeatedly melted and reground without change in characteristics. It may be further purified, if desired, as by treatment with adsorbents such as activated carbon. Ethers, esters and salts may be formed therefrom, depending upon the specific use and shade or color desired.

A specific example directed to the manufacture of a dye for use in rouge, lipsticks and other cosmetics will now be described. For these purposes it is desired to obtain a dye stuff which is relatively free from blue tones. Although any of the halogen derivatives of phthalic anhydride may be employed, such as the mono-, di-, tri- or tetra-halogen derivative, and although either chlorine, bromine or iodine or any two or three of these may be employed, splendid results have been obtained by the use of a 3-brom phthalic anhydride. It is to be understood that by using the other derivatives, minor variations in properties and color of the final compound will result.

Furthermore, either alpha or beta forms of resorcylic acid may be used but the beta form appears to be more practical commercially. The resorcylic acid should be substantially free from resorcinol. Resorcinol does not contain the carboxyl group and in the event it is present, impairs the non-toxic and non-allergic properties of the product of this invention.

The 3-brom phthalic anhydride and the resorcylic acid are then placed in a reaction kettle and if desired a dehydrating agent, such as zinc chloride, calcium chloride or the like, is added. The two or three ingredients used may or may not be premixed. It has been found that by placing the 3-brom phthalic anhydride on the bottom of the reaction kettle and then placing the remainder of the reaction mixture on top, the anhydride melts as the kettle is heated from below and dissolves the resorcylic acid and the zinc chloride or other dehydrating agent, the mass becoming effectively mixed as the reaction proceeds. In a typical batch, approximately 227 pounds of 3-brom phthalic anhydride were mixed with 308 pounds of anhydrous beta resorcylic acid and 68 pounds of anhydrous zinc chloride. It is to be noted that the ingredients are in substantially molecular proportions, that is, 1 molecular equivalent of phthalic anhydride is coupled with 2 molecular equivalents of resorcylic acid.

Heating is continued for an appreciable period of time, say from about 18 to 36 hours. The longer periods of time are preferred on account of the enhanced yield obtained. The temperature of the reaction will vary from about 125° C. to about 205° C. By the use of the specific ingredients and proportions mentioned in the specific example, the optimum reaction temperature appears to be about 155° C.–165° C. During the reaction, atmospheric pressures may be employed although it has been found desirable to conduct the reaction under partial vacuum since the speed of reaction is increased and a better product is obtained. As the reaction proceeds, the thick liquid ceases to bubble and become thicker.

The reaction should be carried out under acid conditions and the presence of water is detrimental and for this reason the use of vacuum and dehydrating agents is recommended.

In order to facilitate removal of the mass from the kettle after the completion of the reaction, it is desirable to chill the contents of the kettle quickly, whereupon the hard, brittle mass may be removed and reduced to a state of fine division. This mass may then be purified by washing to remove unreacted, uncoupled ingredients. In a modified procedure, the reacted mass may be removed from the kettle by means of an alkali solution or other solvent. When alcohol is used as the solvent, the solution can be poured into a large volume of water to precipitate the dye stuff. When alkali solutions are used the dye may be precipitated by the addition of an acid.

At this stage of the process the compound made as above described is a bright golden yellow powder when ground and is characterized by the presence of three benzene rings, two of said rings being joined by an oxygen bridge, each of such two benzene rings containing a carboxyl group in the fourth position relative to the oxygen bridge. The compound may be said to contain a total of three carboxyl groups because of the structure of phthalic anhydride and the ease with which, when salts are formed, metals attach themselves to the carboxyl grouping of the anhydride. The structural formula of this compound may be represented as follows:

*Free dye*

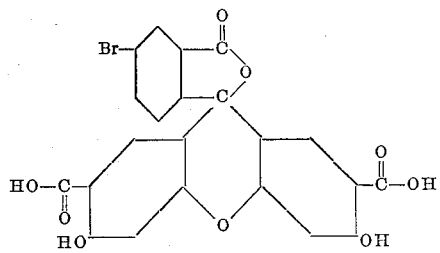

The above compound, having a molecular weight of 499, may then be utilized in the preparation of any desired halogen derivative, ester, salt or the like. In the manufacture of dye stuffs particularly adapted for use in cosmetics, lipsticks, etc., the compound is brominated. Bromination is readily accomplished at room temperatures and atmospheric pressure although some temperature rise may be observed due to the exothermic nature of the reaction. Although the finely ground base compound may be brominated in solid phase with bromine vapors, the bromination is preferably carried out by either dissolving or suspending the base compound in a vehicle which may or may not exert a solvent action upon the base compound. Vehicles such as glacial acetic acid, ethyl, isopropyl or butyl alcohol, glycol derivatives, etc., may be employed. Preferably the solvent or vehicle used should not react to any appreciable extent with the bromine. The use of glass or enamel-lined equipment is recommended during bromination.

The bromination may be terminated at any desired stage so that the resulting products may vary from monobrom to tetrabrom. For purposes of illustration, the dibrom compound and the tetrabrom compound are illustrated in the following structural formulas:

*Di brom*

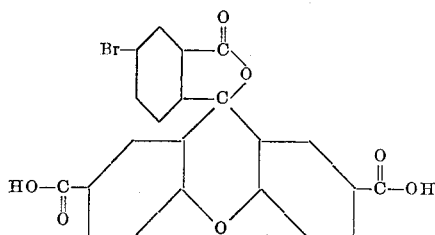

Fig. 1

*Tetra brom*

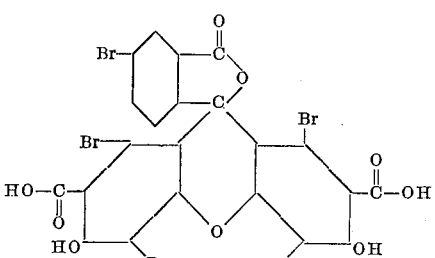

Fig. 2

Attention is called to the fact that the tetrabrom compound above illustrated gives rise to a red dye which has a slight or perceptible bluish tint by reflected light, particularly when the dye is applied to the skin. The dibrom compound, however, is a bright red-orange.

In the event the original phthalic anhydride is completely brominated and the coupled compound made therefrom is also thoroughly brominated, then the final product may contain eight bromine atoms. This applies to other halogens or mixtures thereof. Attention is further called to the fact that the dyestuff may be termed a derivative of fluoran (see Hackles Chemical Dictionary).

If desired, the basic compound may be esterified by any of the standard methods as, for example, by treating the compound with a dehydrating agent in the presence of the desired alcohol. Several degrees of esterification are possible, depending upon the degree of the treatment. A mono-ethyl-ester of the dibrom derivative has a structural formula as follows:

Mono Ethyl Ester

*Dibrom deriv.*

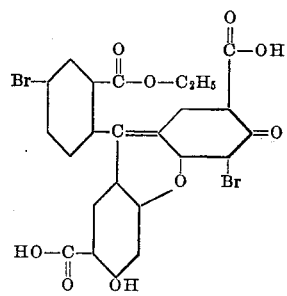

The dye stuffs prepared in accordance with this invention may be termed "oil-soluble" but are much more soluble in fixed oils than in hydrocarbon solvents and are only slightly soluble in petroleum ether. The indelible character of the colors is of value when they are employed as stains in lipsticks or the like. The colors appear to be resistant to the action of light and have a very useful range. Strips of blotting paper impregnated with a solution of the free dyes in alcohol, when viewed by reflected light, may, for example, vary in color from number 4 to a color between numbers 7 and 8 appearing on plate 2, entitled "The 24 Standards of Hue", of Wilhelm Ostwald's "Colour Science", Part I, published by Winsor & Newton, Limited, of London. Flourescein similarly compared is slightly lighter than number 3 of the same plate. Ridgeway's "Color Standards and Nomenclature" does not show colors of the same brilliance or hue, but some of the dyes of this invention resemble Ridgeway's Apricot Orange, Salmon Orange, Coral Red, Rose Doree, Peach Red Grenadine, and Grenadine Pink. Deeper shades are obtained from metal and alkali salts of the dyestuff of this invention.

By reason of the presence of the carboxyl groups as described, the resulting dye stuff does not exhibit toxic or allergic effects and therefore can be employed in certain food stuffs and in contact with the skin. They can be used in the formation of lakes, and in dyeing of fabrics (particularly wool and silk) and leather. The dyes are resistant to light and will not bleach in the presence of acids or alkalies. It is to be noted that the dye stuffs of this invention are free from nitroso, nitro, amino and substituted amino groups whereas compounds containing such groups are usually either toxic or have the properties of a hypnotic or anesthetic.

If desired, salts can be made from the original coupled material or from the halogenated product. Salts of alkalies, alkali earth metals or heavier metals such as zinc, lead, mercury, etc., can be made. The alkali and alkali earth salts are water soluble. Usual methods are employed. For example, in the manufacture of a sodium salt, the coupled dye stuff may be dissolved in sufficient NaOH solution to make the desired salt and then salted out or separated by evaporation.

Substantially all of the dyes of this invention exhibit fluorescence in solution. Substantially all of them are non-toxic and have no allergic properties even though they are indelible and combine with the skin. Fluorescein is toxic and does not combine with the skin. The free dyes of this invention differ from phthaleins and fluorescein by a higher solubility in water and oils. The derivations of the free dyes of this invention are more deeply colored and have a markedly higher tinctorial power than corresponding fluorescein derivatives. Freshly precipitated fluorescein changes in color upon being boiled but the compounds of this invention do not. These and many other characteristics definitely distinguish the compounds from the closest prior dyes.

The term "toxic" as applied to the dyes of this invention refers to properties which are evidenced by physiological manifestations, such as chapping, itching, blistering, swelling, etc. in or on humans who have a hyperreactivity to such dyes and who are sensitized by the application of the dyes to the mucous membrane or abraded skin. The term "toxic" as used, therefore, is not limited in meaning to actual poisons capable of producing much more serious physiological changes.

We claim:

1. A method of making a dihydroxy, dicarboxy fluoran dye in which the hydroxy and carboxy radicals are on the benzene rings that are linked through an oxygen bridge, comprising: reacting one molecular equivalent of phthalic anhydride with two molecular equivalents of resorcylic acid in one step, in the absence of alkalies, in the presence of a dehydrating agent and at a temperature of between 125° C. and 205° C.

2. A method of making a dihydroxy, dicarboxy fluoran dye in which the hydroxy and carboxy radicals are on the benzene rings that are linked through an oxygen bridge, comprising: reacting phthalic anhydride with resorcylic acid in substantially molecular proportions and in a single step, in the absence of alkalies, purifying the resulting compound, and halogenating the purified compound, the resulting dye stuff being non-toxic, free from nitroso, nitro, amino and substituted amino groups and having indelible characteristics.

3. A method of making a dihydroxy, dicarboxy fluoran dye in which the hydroxy and carboxy radicals are on the benzene rings that are linked through an oxygen bridge, comprising: reacting one molecule of brominated phthalic anhydride with two molecules of resorcylic acid in a single step, in the absence of alkalies, purifying the resulting compound, and halogenating the purified compound, the resulting dye stuff being non-toxic, free from nitroso, nitro, amino and substituted amino groups and having indelible characteristics.

4. In a process of producing symmetrical non-toxic dyes of a hydroxy phthalein type and containing three benzene rings, the step of condensing two mols of a dihydroxy benzene carboxylic acid free from nitroso, nitro, amino and substituted amino groups with one mol of phthalic anhydride.

5. A dye stuff derived from phthalic anhydride and resorcylic acid, having the following general formula:

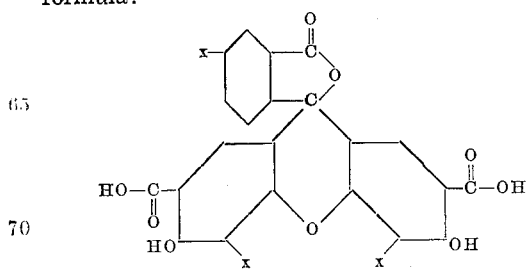

in which X represents a halogen.

6. A dye stuff obtained by coupling phthalic anhydride and resorcylic acid, and halogenating, said dye stuff having the following general formula:

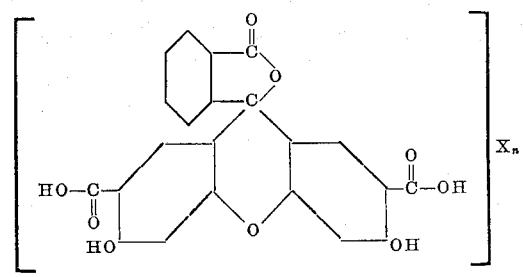

in which X represents a halogen and where N is a number from 1 to 8.

7. A substantially non-toxic indelible dye stuff having the following general formula:

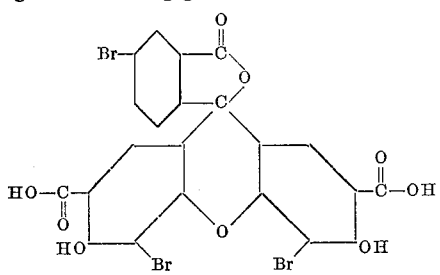

8. A dye stuff derived from phthalic anhydride and resorcylic acid, having the following general formula:

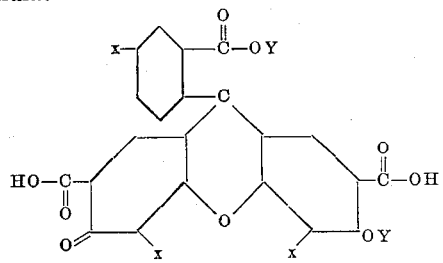

in which X represents a halogen and Y represents an alkali metal.

9. As an indelible substantially nontoxic dye stuff, a dihydroxy dicarboxy fluoran, in which each of the benzene rings that are linked through an oxygen bridge have attached thereto a hydroxy and a carboxy radical, the benzene ring of the phthalyl residue containing no substituents other than radicals of the group consisting of hydrogen and halogen, said dye stuff being free from nitroso, nitro, amino and substituted amino groups.

10. A dye stuff comprising a halogenated dihydroxy dicarboxy fluoran, in which each of the benzene rings that are linked through the oxygen bridge have attached thereto a hydroxy and a carboxy radical, the benzene ring of the phthalyl residue containing no substituents other than radicals of the group consisting of hydrogen and halogen, said dye stuff being free from nitroso, nitro, amino and substituted amino groups.

11. A dye stuff comprising a brominated dihydroxy dicarboxy fluoran, in which each of the benzene rings that are linked through the oxygen bridge have attached thereto a hydroxy and a carboxy radical, the benzene ring of the phthalyl residue containing no substituents other than radicals of the group consisting of hydrogen and halogen, said dye stuff being free from nitroso, nitro, amino and substituted amino groups.

PAUL W. JEWEL.
JOHN R. PRATT.